Patented June 8, 1943

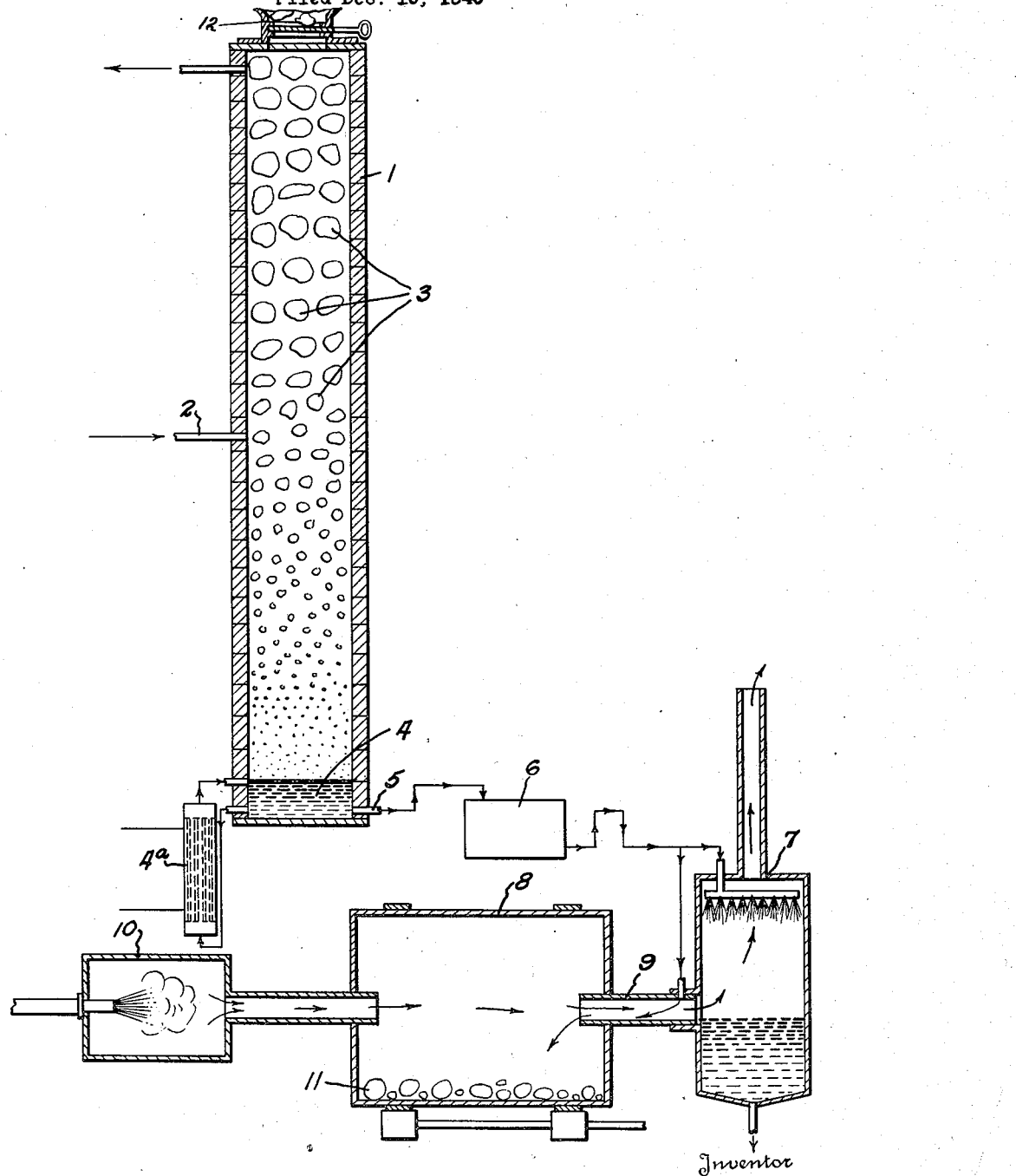

2,321,282

UNITED STATES PATENT OFFICE 2,321,282

DRY HYDROGEN CHLORIDE

Rock L. Comstock, Weeks, La., assignor to Bay Chemical Company, Inc., New Orleans, La., a corporation of Louisiana Application December 10, 1940, Serial No. 369,488

4 Claims. (Cl. 23—154)

This invention relates to producing dry HCl from aqueous hydrochloric acid of any concentration, and particularly from dilute hydrochloric acid solution.

Various proposals have been made for concentrating hydrochloric acid, but have been objectionable in point of need for expensive equipment, or of costs of operation. Special materials of construction have been required inasmuch as the acid is corrosive. For commercially feasible operations, expensive fractionating columns have been required and considerable volume of liquid has had to be circulated.

An important purpose is to obtain directly from dilute aqueous hydrochloric acid a dry gas of over 99% HCl, or even containing less than 0.3% water. A particular object is to obtain dry HCl from dilute aqueous acid in one step.

An object also is to utilize dehydrating material of such nature and in such manner as to facilitate regenerating the material inexpensively and with but low loss of material, as contrasted with sulphuric acid on re-concentration.

A further purpose of this invention is to obtain dry HCl from dilute acid by removal of water from the entire system simply and substantially automatically.

An important purpose also is to introduce requisite heat into the dehydrating system simply and directly by an improved method of minimizing heat transfer surfaces.

Also an object is to economize in fuel or heat energy to produce dry HCl from aqueous commercial grade muriatic acid of any concentration.

An important object of this invention moreover, is to concentrate dilute muriatic acid in equipment of cheap construction and to obtain HCl thereby without requiring fractionating columns and without super-atmospheric pressure. The present invention avoids fractionating columns and condensers with their higher requirements of heat and water.

A further object is to supply apparatus that is adaptable to obtain dry HCl gas either periodically or continuously from dilute aqueous acid.

Also, an object is to dehydrate hydrochloric acid with substantial avoidance of circulating equipment.

These objects and others will be apparent from the following illustrative description of the principles of this invention.

A preferred embodiment of illustrative nature is shown in the accompanying drawing, while novel features of this invention are particularly pointed out in the appended claims.

In the drawing, Figure 1 is a diagrammatic representation of a flow sheet including means to produce dry HCl from dilute hydrochloric acid according to this invention.

Broadly, according to the principles of this invention, muriatic acid is concentrated by heating the acid in the presence of solid anhydrous $CaCl_2$ with gradual elevation of temperature approximately to that of boiling 50% aqueous $CaCl_2$ solution. This temperature is approximately 125° C. Preferably the dilute acid flows over a column of the $CaCl_2$ in the form of solid lumps with gradual rise of temperature to about 125° C. The HCl evolved flows countercurrently to the liquid and into contact with progressively drier $CaCl_2$. Heat of solution is released from the solid $CaCl_2$ and additional heat is supplied to the effluent $CaCl_2$ solution. Thus, concentration of HCl is effected by removal of water gradually through fractional distillation of dilute muriatic acid in the presence of solid $CaCl_2$, both distilland and distillate contacting solid $CaCl_2$ with the residual distilland gradually forming a solution of increasing concentration of $CaCl_2$ and gradually being heated to about 125° C. In preferred practice the effluent $CaCl_2$ solution flows countercurrently to a supply of steam or supply of hot gas of exceedingly little or of no content of HCl. Such is provided conveniently by boiling effluent $CaCl_2$ solution and leading the heated vapors therefrom into the column.

Reference may be made more particularly to the accompanying drawing and description of suitable apparatus to carry on this invention. It will be understood however that the invention is not necessarily limited to these particular illustrations and embodiments, but may be executed otherwise.

In the drawing is shown a tower 1. This may be constructed of inexpensive material resistant to muriatic acid, such as brick, or resinous material or steel lines with tile, for example. At some intermediate point is an inlet 2 to introduce dilute acid liquid. The tower is filled with anhydrous solid $CaCl_2$ in the form of lumps or chunks 3 which may be supplied to the tower by means such as the valved hopper 12 located at the upper end of the tower. These offer considerable surface area both to the down-flow of aqueous acid and to the up-flow of HCl gas removed from the aqueous acid. The lower end of the tower opens into a suitable receiver 4 for effluent $CaCl_2$ solution.

The receiver 4 is connected with a suitable boiler 4a so that heated vapors may be conducted directly into a lower part of the CaCl₂ column 3.

Means 5 are provided to remove accumulated CaCl₂ solution from receiver 4 to a receptacle 6 for treatment with neutralizing agent. Suitable neutralizing agents are lime or calcium carbonate which form additional CaCl₂. Then the system comprises means to raise the heat level of the CaCl₂ solution and even to produce anhydrous CaCl₂ therefrom, such as spray tower 7 and rotary drum 8. A flue 9 is provided to convey hot gases from drum 8 into spray tower 7. A suitable source of heat is combustion chamber 10 discharging into rotary drum 8. In drum 8 are contained lumps of solid CaCl₂.

In the flow of material through this system, aqueous HCl of any desired concentration may be introduced to the lumps of anhydrous CaCl₂ in dehydration column 3. Preferably, the acid inlet 2 is at about the middle of dehydration tower 1. From the incoming aqueous acid the anhydrous CaCl₂ at once abstracts a considerable amount of water, with corresponding evolution of heat. Thus the solution of CaCl₂ is formed and flows with the progressing acid solution through the lumps of CaCl₂. Progressively, water is abstracted from the acid to form CaCl₂ solution while HCl and water vapor flow against the solution to the drier end of the CaCl₂ column. As the flowing solution increases in concentration of CaCl₂ the solution gradually becomes depleted in HCl. As this solution progresses, heat is introduced into the effluent liquid so that the liquid becomes increasingly impoverished in HCl. The heat input may be regulated so that the effluent CaCl₂ solution is at a temperature of about 125° C. Thus the effluent liquid is automatically regulated to contain about 50% CaCl₂. To effect this heating and sweeping out of HCl, CaCl₂ solution in receiver 4 at the end of the CaCl₂ column is heated to boiling. Preferably, a portion of the liquid in receiver 4 is withdrawn to a separate boiler 4a from which steam, which may contain minor amounts of HCl, is conducted into the bottom of CaCl₂ column 3.

Thus any residual HCl is introduced immediately into the descending column of CaCl₂ solution.

From receiver 4 the CaCl₂ solution is withdrawn suitably for removal of water and for recovery of CaCl₂. The CaCl₂ may be returned to the system in the form of lumps for introduction into the top of the dehydrating tower or may be re-introduced at higher temperature into the CaCl₂ reservoir 4 at the bottom of the dehydrating tower.

The CaCl₂ solution, when suitably increased in concentration, is an appropriate medium for introduction of heat to the system. However, this means of introducing heat into the system constitutes an alternative that may not necessarily be suitable in all cases, particularly where pumping costs would be burdensome. Nevertheless, concentration of the CaCl₂ solution may be effected conveniently in an atmosphere of hot gas in spray tower 7. Water vapor is eliminated from the system at the upper portion of the tower 7. The liquid flow through tower 7 may be regulated by simple control so as to yield a solution of approximately 70% of CaCl₂ at the bottom of the tower 7. This relatively concentrated solution is at considerably higher temperature than the more dilute solution of 50% CaCl₂ at the bottom of the dehydrating column. This heat energy may be introduced directly into the solution in receiver 4 even to maintain boiling thereof and without requiring heat interchangers.

A portion of CaCl₂ solution may be dehydrated in heated rotary drum 8. Lumps 11 of CaCl₂ in drum 8 promote evaporation of incoming solution while rotation of the drum and consequent agitation promotes formation of lumps rather than of dust. The lumps are removed in conventional manner from drum 8.

Evaporation in drum 8 is brought about by hot gases introduced to above 400° C. from furnace 10. These hot gases, mingled with steam from the evaporating solution of CaCl₂, flow into tower 7 at relatively high temperatures so as to evaporate water readily in spray tower 7 and to concentrate the dilute CaCl₂ being sprayed therein. The cooled combustion gases leave the system mingled with water vapor. The calcium chloride lumps in the tower 1 may be replenished from time to time from the hopper 12 so as to maintain the column above the point of introduction of the hydrochloric acid, making the process continuous.

In operation of dehydrating tower 1, the column of solid anhydrous CaCl₂ moves downwardly readily in contact with incoming dilute aqueous acid and in contact with steam rising in the lower end of the column. In the tower essentially fractional distillation occurs within the column of CaCl₂, with a solution of water, CaCl₂ and HCl of constantly changing concentrations being in contact with solid CaCl₂. Water already in the system in the form of CaCl₂ solution at the bottom of the tower serves, when vaporized from accumulated CaCl₂ solution, to heat and to distill the effluent CaCl₂ solution. This occurs without increasing the accumulation of water in the system and is counteracted by appropriate withdrawal of the accumulated CaCl₂ solution for concentration.

Conditions in the dehydrating tower are maintained substantially constant automatically by the descending CaCl₂ column in the upper part of the column. The evolved HCl vapors rise into progressively drier portions of CaCl₂ with accompanying evolution of heat of solution of CaCl₂. This progressive heating and distillation to drier parts of the column accomplishes substantially complete removal of water vapor so that the effluent gases from the top of the column contain over 99% HCl and contain even as little as 0.3 or 0.2% water. At the lower end of the column effluent solution may be maintained by control of the rate of boiling and by the rate of removal of solution for dehydration at approximately 125° C. This corresponds to approximately 50% CaCl₂ solution. Under these conditions the efficiency is such that CaCl₂ in receiver 4 may contain only about 0.25% HCl. This is a recovery of about 98.7% of the HCl introduced. Evolved vapors of HCl move countercurrently to the descending acid in solution of CaCl₂. The column of CaCl₂ itself descends automatically as the lumps dissolve in the acid liquid. Thus, substantially complete dehydration of dilute muriatic acid is effected in this simple and inexpensive automatic system.

Release of heat and separation of HCl occur progressively in the CaCl₂ column while advantage is taken of the low solubility of HCl in concentrated CaCl₂ solution when heated. The system does not preclude the use of auxiliary heating means of conventional nature, if desired.

While in accordance with the patent statutes I have set forth the principles of this invention and have illustrated a preferred practice thereof by specific example, it will now be apparent to those skilled in the art that modifications may be made within the scope of the appended claims.

What I claim is:

1. A process for producing substantially anhydrous hydrogen chloride comprising contacting a moving column of solid lumps of calcium chloride with liquid aqueous hydrogen chloride solution wherein said solution is introduced into the column intermediate the ends thereof, progressively dissolving the solid calcium chloride in the said hydrogen chloride solution and progressively evolving hydrogen chloride as the materials move toward one end of the column, simultaneously progressively increasing the temperature of the materials as they move toward said end, removing the calcium chloride from said end as a spent heated aqueous solution, progressively dehydrating hydrogen chloride gas evolved from the aqueous solution by contacting the evolved hydrogen chloride gas with the solid calcium chloride intermediate the point of introduction of the aqueous hydrogen chloride solution and the opposite end of the column, and withdrawing substantially anhydrous hydrogen chloride gas from said opposite end of said column.

2. A process for producing substantially anhydrous hydrogen chloride comprising contacting a moving column of solid granular calcium chloride with liquid aqueous hydrogen chloride solution wherein said solution is introduced into the column intermediate upper and lower ends thereof, progressively dissolving the solid calcium chloride in the said hydrogen chloride solution and progressively evolving hydrogen chloride as the materials move toward the lower end of the column, simultaneously progressively increasing the temperature of the materials as they move toward said lower end, removing the calcium chloride from said lower end as a spent heated aqueous solution, progressively dehydrating hydrogen chloride gas evolved from the aqueous solution as a result of the heating operation by contacting the evolved hydrogen chloride gas with the solid calcium chloride intermediate the point of introduction of the aqueous hydrogen chloride solution and the upper end of the column, and withdrawing substantially anhydrous hydrogen chloride gas from said upper end of said column.

3. A process for producing substantially anhydrous hydrogen chloride comprising contacting a moving column of solid granular calcium chloride with liquid aqueous hydrogen chloride solution wherein said solution is introduced into the column intermediate the ends thereof, progressively dissolving the solid calcium chloride in the said hydrogen chloride solution and progressively evolving hydrogen chloride as the materials move toward one end of the column, simultaneously progressively increasing the temperature of the materials as they move toward said end, removing the calcium chloride from said end as a spent heated aqueous solution, progressively dehydrating hydrogen chloride gas evolved from the aqueous solution as a result of the heating operation by contacting the evolved hydrogen chloride gas with the solid calcium chloride intermediate the point of introduction of the aqueous hydrogen chloride solution and the opposite end of the column, withdrawing substantially anhydrous hydrogen chloride gas from said opposite end of said column, and recovering the calcium chloride.

4. A continuous process for producing substantially anhydrous hydrogen chloride comprising contacting a moving column of solid lumps of calcium chloride with liquid aqueous hydrogen chloride solution wherein said solution is introduced into the column intermediate the ends thereof, maintaining the column of lumps of calcium chloride anterior to the point of introduction of the hydrogen chloride solution, progressively dissolving the solid calcium chloride in the said hydrogen chloride solution and progressively evolving hydrogen chloride as the materials move toward the posterior end of the column, simultaneously progressively increasing the temperature of the materials as they move toward said posterior end, removing the calcium chloride from said posterior end as a spent heated aqueous solution, progressively dehydrating hydrogen chloride gas evolved from the aqueous solution by contacting the evolved hydrogen chloride gas with the solid calcium chloride intermediate the point of introduction of the aqueous hydrogen chloride solution and the anterior end of the column, and withdrawing substantially anhydrous hydrogen chloride gas from said anterior end of said column.

ROCK L. COMSTOCK.